US008654423B2

(12) United States Patent
Brown

(10) Patent No.: US 8,654,423 B2
(45) Date of Patent: Feb. 18, 2014

(54) LOW COST LONG-LIFE COMPACT LOW WOBBLE WIDE SCAN ANGLE TAUT-BAND RESONANT SCANNERS WITH MATCHED COEFFICIENTS OF THERMAL EXPANSION AND INTERCHANGEABLE MIRRORS

(75) Inventor: David C. Brown, Northborough, MA (US)

(73) Assignee: Cambridge Technology, Inc., Bedford, MA (US)

( * ) Notice: Subject to any disclaimer, the term of this patent is extended or adjusted under 35 U.S.C. 154(b) by 429 days.

(21) Appl. No.: 13/009,939

(22) Filed: Jan. 20, 2011

(65) Prior Publication Data
US 2011/0181932 A1    Jul. 28, 2011

Related U.S. Application Data

(60) Provisional application No. 61/297,534, filed on Jan. 22, 2010.

(51) Int. Cl.
*G02B 26/08*    (2006.01)

(52) U.S. Cl.
USPC .................. 359/198.1; 359/199.1; 359/221.2; 359/224.1

(58) Field of Classification Search
USPC .......... 359/198.1–199.4, 200.6–200.8, 221.2, 359/223.1–226.2
See application file for complete search history.

(56) References Cited

U.S. PATENT DOCUMENTS

| 4,686,363 A | 8/1987 | Schoon |
| 4,990,808 A | 2/1991 | Paulsen |
| 5,247,384 A | 9/1993 | Inoue et al. |
| 5,528,411 A | 6/1996 | Burdenko |
| 6,243,186 B1 | 6/2001 | Melville |
| 6,245,590 B1 | 6/2001 | Wine et al. |
| 6,285,489 B1 | 9/2001 | Helsel et al. |
| 6,525,310 B2 | 2/2003 | Dunfield |
| 6,882,462 B2 | 4/2005 | Helsel et al. |
| 7,414,503 B1 | 8/2008 | Orcutt et al. |
| 7,436,574 B2 | 10/2008 | Ko et al. |
| 7,516,896 B2 | 4/2009 | Helsel et al. |
| 2004/0119004 A1 | 6/2004 | Wine et al. |
| 2005/0099665 A1 | 5/2005 | Lee et al. |
| 2005/0179985 A1 | 8/2005 | Kato et al. |

FOREIGN PATENT DOCUMENTS

WO    WO2006088779    8/2006

OTHER PUBLICATIONS

International Preliminary Report on Patentability issued on Aug. 2, 2012 in connection with International Appln. No. PCT/US2011/021788, 9 pages.
International Search Report and Written Opinion for PCT/US2011/021788 mailed on Jun. 16, 2011, 14 pages.

*Primary Examiner* — James Phan
(74) *Attorney, Agent, or Firm* — Gesmer Updegrove LLP

(57) ABSTRACT

A taut-band resonant scanner is disclosed that includes an elongated band and a sub-assembly. The elongated band has a length in an elongated direction, a width in a width direction that is orthogonal to the elongated direction, and a thickness in a thickness direction that is orthogonal to both the width direction and the elongated direction, wherein the thickness is substantially smaller than the width and wherein the width direction and elongated direction define a band width/length plane. The sub-assembly is attached to a portion of the band, and includes at least one mounting structure.

15 Claims, 10 Drawing Sheets

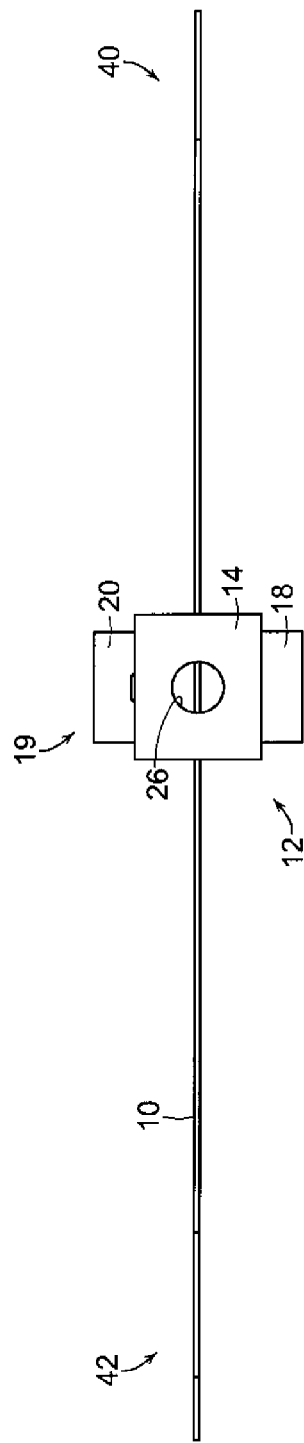
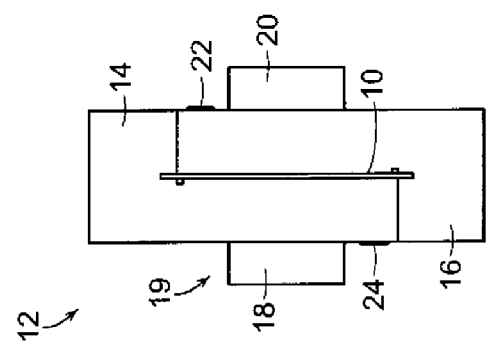
FIG. 3
FIG. 4

LOW COST LONG-LIFE COMPACT LOW WOBBLE WIDE SCAN ANGLE TAUT-BAND RESONANT SCANNERS WITH MATCHED COEFFICIENTS OF THERMAL EXPANSION AND INTERCHANGEABLE MIRRORS

PRIORITY

This application claims priority to U.S. Provisional Patent Application Ser. No. 61/297,534 filed Jan. 22, 2010, the entire disclosure of which is hereby incorporated by reference.

BACKGROUND

The invention generally relates to resonant scanners, and relates in particular to taut-band resonant scanners that include an elongated stiff band that is held in tension to provide the resonance frequency for the scanner.

Conventional taut-band resonant scanners however, typically suffer from a variety of drawbacks. First, many conventional taut band resonant scanners include a certain amount of undesired wobble during use. Second, stress on the band is typically concentrated where the band attaches to the mirror mounting structure and/or the band clamping structure, and such concentrated stress may lead to failure of the band at those locations.

Third, the band-load combinations are fixed, so that a desired change in mirror dimension or frequency of operation typically requires replacement of the mirror, it's counter mass if any, the band, and often the entire structure leading to excess cost in manufacture and repair. Fourth, temperature changes during operation may have a significant negative impact on operation due to the varied thermal expansion of the individual components, which leads to a concomitant change in the operating natural frequency of the device.

Further, environmental corrosion also negatively impacts operation. For example, many conventional taut band resonant scanners employ clock spring steel for the band, but this material typically develops rust as well as stress corrosion cracking during use, which causes failure of the band long before the design lifetime is reached.

There is a need therefore, for a taut band resonant scanner that avoids or minimizes at least the above drawbacks.

SUMMARY

In accordance with an embodiment, the invention provides a taut-band resonant scanner that includes an elongated band and a sub-assembly. The elongated band has a length in an elongated direction, a width in a width direction that is orthogonal to the elongated direction, and a thickness in a thickness direction that is orthogonal to both the width direction and the elongated direction, wherein the thickness is substantially smaller than the width and wherein the width direction and elongated direction define a band width/length plane. The sub-assembly is attached to a portion of the band, and includes at least one mounting structure.

In accordance with another embodiment, the invention provides a taut-band resonant scanner including an elongated band, a sub-assembly, and a housing. The elongated band is formed of a material having a first coefficient of thermal expansion. The sub-assembly is attached to a portion of the band, and is formed of two half portions that capture the band between the half portions. The housing includes mounting structures to which the band is secured in tension within the housing. The mounting structures are formed of a material having a second coefficient of thermal expansion, wherein the first coefficient of thermal expansion is substantially the same as the second coefficient of thermal expansion.

In accordance with a further embodiment, the invention provides a taut-band resonant scanner for use with any of a plurality of mirrors and for use at a plurality of operating frequencies. The taut-band resonant scanner includes an elongated band and a sub-assembly. The elongated band has a length in an elongated direction, a width in a width direction that is orthogonal to the elongated direction, and a thickness in a thickness direction that is orthogonal to both the width direction and the elongated direction, wherein the thickness is substantially smaller than the width and wherein the width direction and elongated direction define a band width/length plane. The sub-assembly is attached to a portion of the band, and is formed of two half portions that capture the band between the half portions. The sub-assembly includes mounting features on opposing ends of the sub-assembly to which a mirror and a counter-weight mass may be attached, and includes at least one magnet having an exposed face in a plane that is substantially parallel with the band width/length plane.

BRIEF DESCRIPTION OF THE DRAWINGS

The following description may be further understood with reference to the accompanying drawings in which:

FIG. 3 shows an illustrative top view of the band and mirror mounting structure shown in FIG. 2 taken along line 3-3 thereof;

FIG. 4 shows an illustrative end view of the band and mirror mounting structure shown in FIG. 2 taken along line 4-4 thereof;

The drawings are shown for illustrative purposed only.

DETAILED DESCRIPTION

It has been discovered that many of the above drawbacks result from deficiencies the design of the resonant scanners themselves, and it has further been discovered that such drawbacks may be minimized or eliminated through an improved design of taut-band resonant scanners.

In particular, it has been discovered the wobble results, at least in part, from attaching the mirror in parallel with the width dimension of the band. This is because such attachment leads to excess tilting of the mirror in a direction orthogonal to the desired tilt of the mirror. This causes the obnoxious undesirable deflection of the processed light beam perpendicular to the desired deflection which is the wobble. It has been discovered that attaching the mirror in a plane that is orthogonal to the plane of the width dimension of the band avoids this wobble.

Second, no provision has been made in the prior art to make the transition from the active portion of the band to the clamped portion of the band in a way that minimizes stress prone features. It has been discovered that stress at these transition locations may be minimized by design. Third, the band-load combinations of conventional scanners are fixed, so that a desired change in mirror dimension or frequency of operation requires replacement of the mirror, it's counter mass if any, the band, and often the entire structure. This leads to excess cost in manufacture and repair. Also, by requiring a change in the overall dimension of the scanner, the development of a scanner family (in which all the members are form fit and function interchangeable) is precluded. It has been discovered that a taut band resonant scanner may be developed that avoids this problem.

Fourth, it has been discovered that thermal drift during operation may be avoided if the materials and design are chosen to have similar coefficients of thermal expansion. It has further been discovered that the effects of environmental corrosion and wear may also be avoided through proper choice of materials and design. It is a primary purpose of the invention therefore, to address and correct these several faults of the prior art in a single scanner design model.

Figure 1:
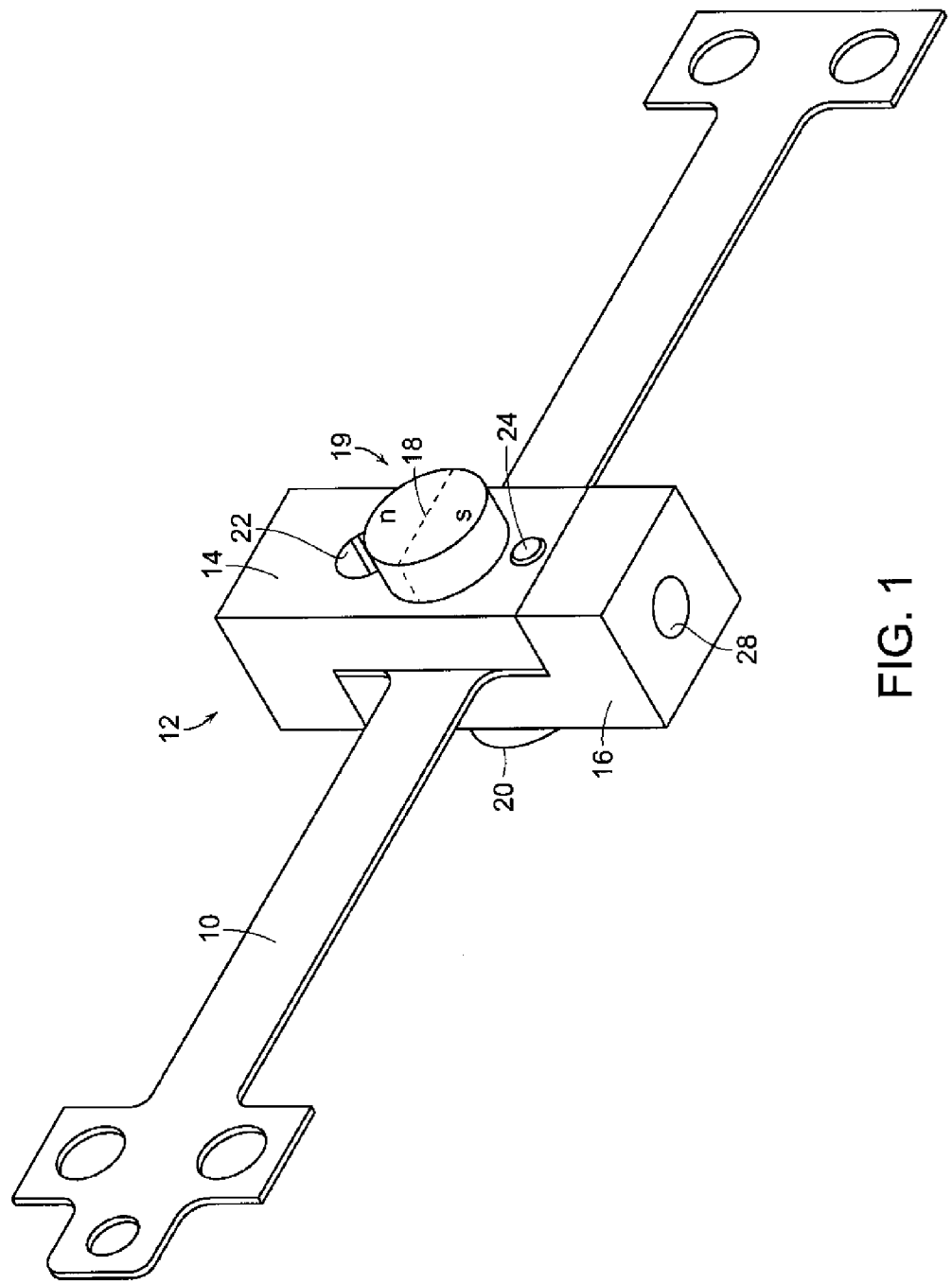
FIG. 1 shows an illustrative isometric view of a band and mirror mounting structure in a system in accordance with an embodiment of the invention.

FIG. 1 shows an illustrative design of a taut band resonant scanner band 10 and sub-assembly in accordance with an embodiment of the invention. The sub-assembly includes a mirror mounting structure 12 that is mounted onto the band 10. The mirror mounting structure 12 includes two half portions 14 and 16 that are joined such that the band 10 is received between them. The half portions 14 and 16 are secured together by screws 22 and 24. The mirror mounting structure 12 includes a magnet 19 having exposed ends 18 and 20 that will be respectively positioned near coils in the scanner unit when assembled. The magnet may, for example, be a bar magnet that is polarized in the short dimension, providing both north and south poles at each end 18 and 20. The use of such a magnet provides manufacturing efficiencies as well as cost reduction, and is relatively low in mass. The mirror mounting structure 12 also includes threaded mounting features 26 (shown in FIGS. 3 and 5) and 28 on the top and underside. A mirror may be mounted to one of the mounting features (e.g., 26) while a counter-weight mass may be mounted to the opposing mounting feature (e.g., 28).

Figure 2:
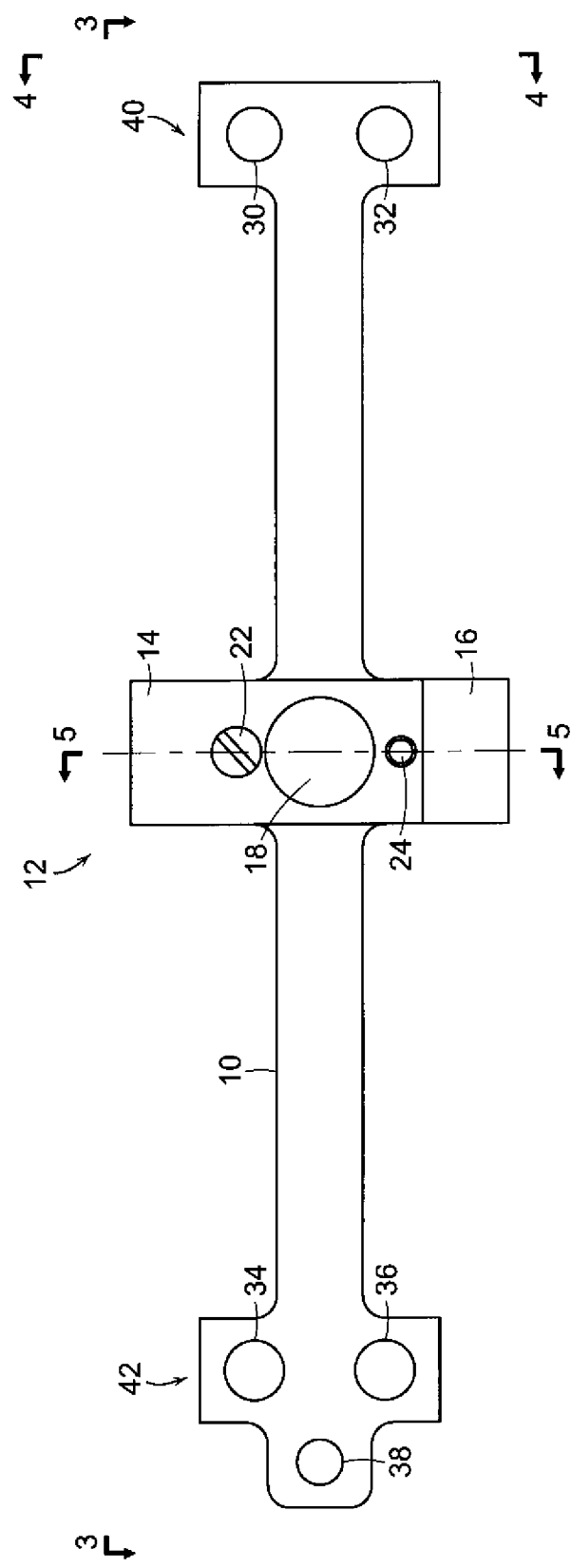
FIG. 2 shows an illustrative plan view of the band and mirror mounting structure shown in FIG. 1.
Figure 5:
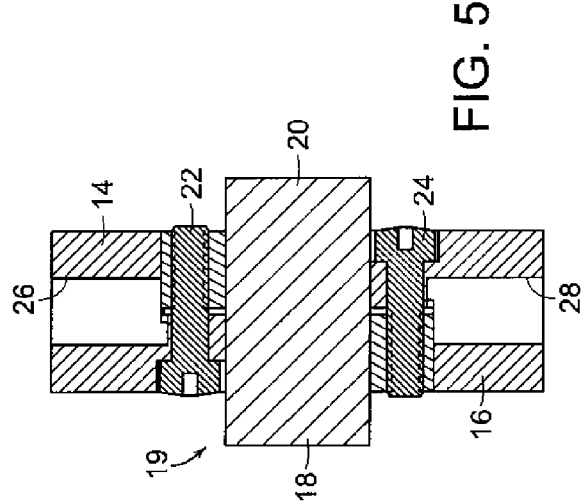
FIG. 5 shows an illustrative sectional view of the band and mirror mounting structure shown in FIG. 2 taken along line 5-5 thereof.
Figure 7:
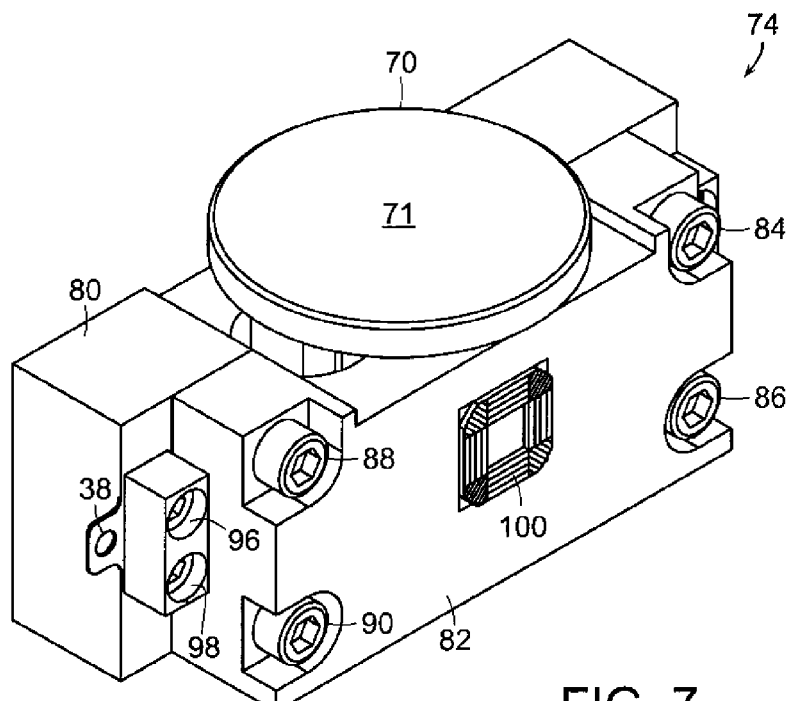
FIG. 7 shows an illustrative isometric top view of a taut-band resonant scanner in accordance with an embodiment of the invention that includes the band and mirror mounting structure shown in FIG. 1.

As shown in FIG. 2, the band 10 includes mounting holes 30 and 32 at one end 40, and includes mounting holes 34 and 36 at the other end 42, as well as a tension adjustment opening 38 to permit the tension on the band 10 to be adjusted when positioned within the scanner unit (as shown in FIG. 7). The mounting holes 34 and 36 may each be shaped (slightly oval-shaped) to accommodate this adjustment. FIG. 3 shows a top view of the sub-assembly of FIG. 2, and FIG. 4 shows a side view of the sub-assembly of FIG. 2 from the right side. FIG. 5 shows a cross-sectional view taken along line 5-5 of FIG. 2 in which the mounting features 26 and 28 are exposed.

Figure 6:
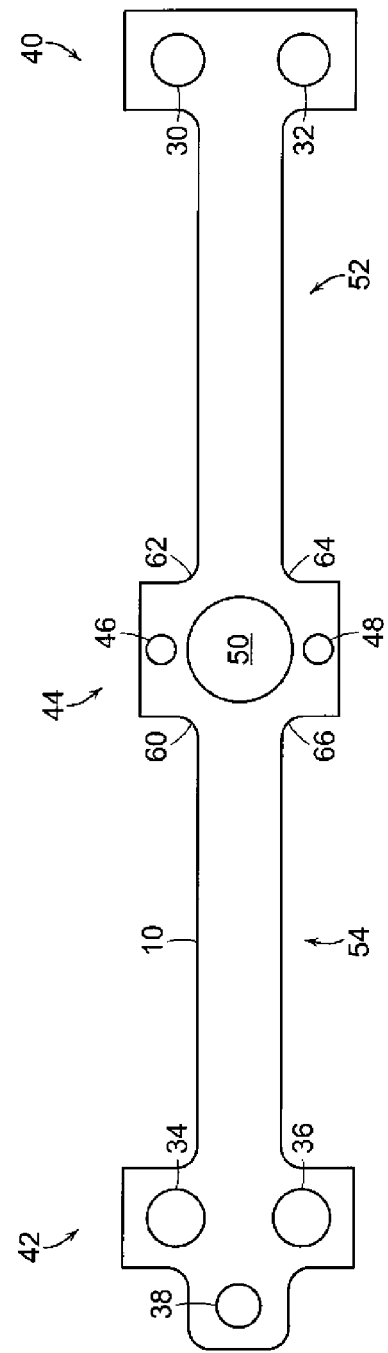
FIG. 6 shows an illustrative plan view of the band shown in FIG. 2 without the mirror mounting structure.

As shown in FIG. 6, the central region 44 of the band 10 includes central mounting holes 46 and 48 for engagement with the screws 22 and 24 of the mirror mounting structure 12. An opening 50 is also provided at the center of the central region 44 of the band 10 for receiving the magnet having the ends 18 and 20. The opening 50 also reduces the effective mass of the increased width at the central region 44.

Figure 8:
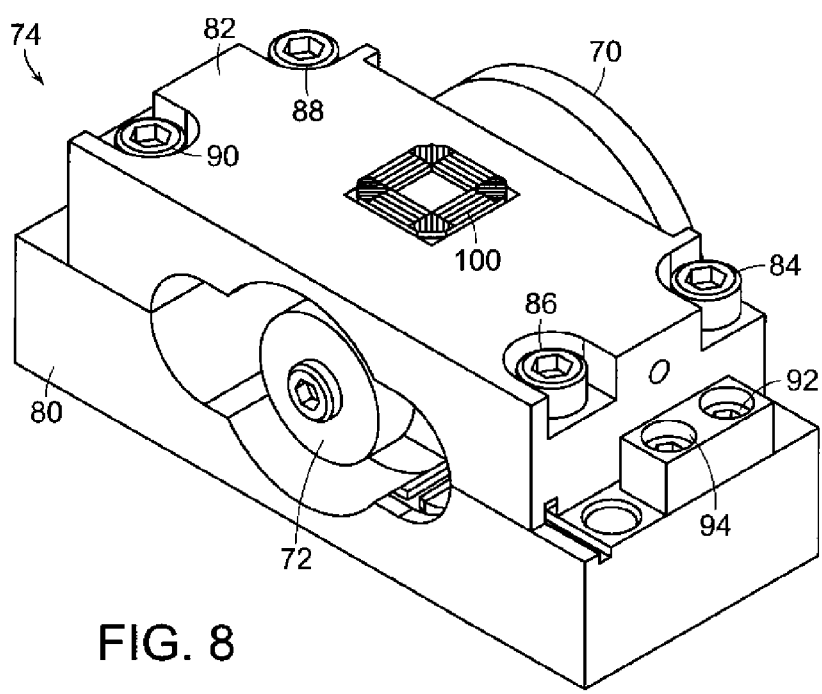
FIG. 8 shows an illustrative isometric side view of the taut-band resonant scanner shown in FIG. 7.

The band 10 is preferably a thin flat band with cross-sectional dimension of large aspect ratio, for example 0.100 inches in width and 0.006 inches in thickness, made of a highly stress and corrosion resistant material such as stainless steel or beryllium copper. The band includes the clamping regions 40, 42 and 44 shown in FIG. 6. The areas 52 and 54 of the band between the regions 40 and 44, and between the regions 42 and 44 are the active regions that undergo torsional movement during use. The mounting block halves 14 and 16 shown at the center of the band when installed make the center section of the band essentially rigid. When supported on the frame within a scanner unit and held in place by the bar clamps and screws (as shown in FIGS. 7 and 8), the ends are also essentially also rigid.

The two long reduced-width areas 52 and 54 therefore are the active parts of the taut band, and are coupled to the rigid sections by transition features (e.g., radii as shown at 60, 62, 64 and 66) that serve to make the width transition regions slowly changing and smooth. Conventional taut band scanners, on the other hand, generally use square-corner transitions. The radii 60, 62, 64 and 66 reduce or eliminate the tendency for stress concentrations to occur at the transition, reducing or eliminating the tendency in the prior art for cracking and failure of the flexure in these regions.

As mentioned above, the mirror and its respective counter mass attach to the mounting structure 12 by screwing onto the opposing ends at threaded mounting features 26 and 28, so that they are perpendicular to the width dimension of the band. In conventional taut band resonant scanners, the mirror, magnet, mounting blocks and counter mass if any have generally been mounted parallel to the width dimension of the band. From the perspective of the natural frequency and the torsional motion of the band, the two methods provide the same frequency. The band 10, however, is also susceptible to resonant motions in both the orthogonal planes centered on the band.

The stiffness of the band is vastly greater in the width dimension than it is in the thickness dimension, so the unavoidable small motions resulting from resonance in the thickness dimension are much larger than those motions in the width dimension. As a result, if the mirror is mounted parallel with the width dimension, the amplitude of the undesirable motion at the mirror face is very large. This motion appears largely as a tipping of the mirror in a direction orthogonal to the desired tilting motion, and is generally referred to as wobble. When the mirror is perpendicular to the width dimension, the stiffness of the flexure in this direction is so large that the wobble motion is reduced to an insignificant value or eliminated entirely. The other orthogonal motion now appears as a rotation of the mirror rather than a tilt, and is usually unimportant.

Figure 9:
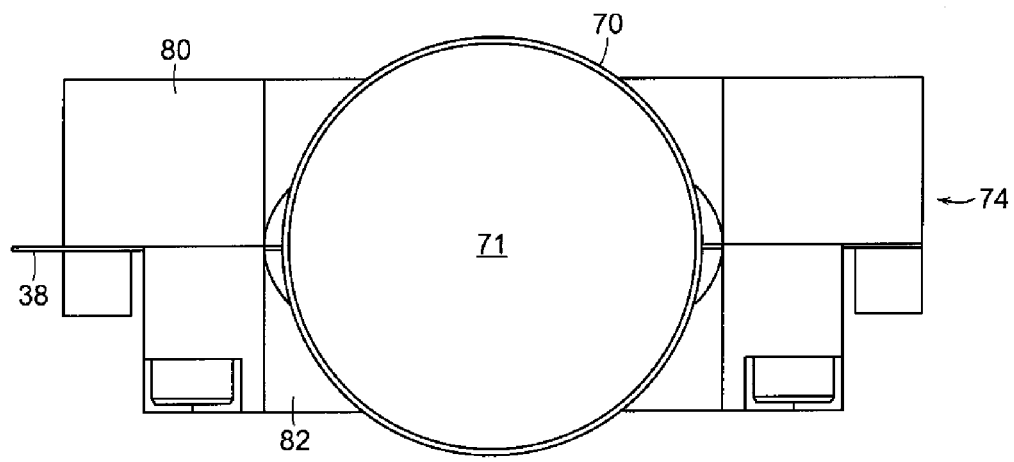
FIG. 9 shows an illustrative top view of the taut-band resonant scanner shown in FIG. 7.
Figure 10:
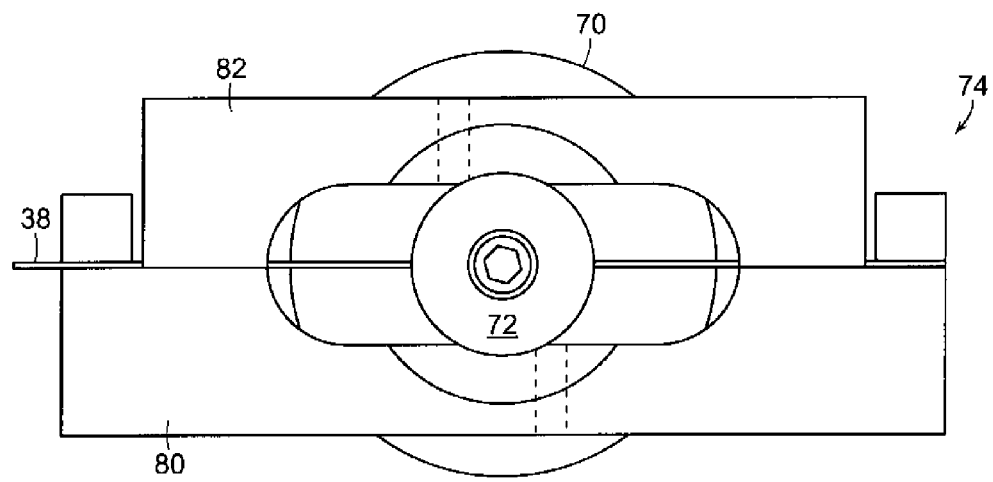
FIG. 10 shows an illustrative bottom view of the taut-band resonant scanner shown in FIG. 7.

FIGS. 7 and 8 show illustrative isometric top and side views of a taut band resonant scanner in accordance with an embodiment of the invention, and FIGS. 9 and 10 show illustrative top and bottom views of the taut-band resonant scanner of FIGS. 7 and 8. In particular, a mirror 70 having a mirror face 71 is mounted on one end (e.g., at feature 26) of the mirror mounting structure 12 within a scanner housing 74, and a counter-weight mass 72 is mounted to the opposing end (e.g., at feature 28) of the mirror mounting structure 12 within the housing 74. The housing 74 is formed by two housing portions 80 and 82 that are held together by screws 84, 86, 88 and 90. The mounting holes 30 and 32 of the band 10 are secured to the housing portion 80 by screws 92 and 94, and the mounting holes 34 and 36 of the band 10 are secured to the housing portion 80 by screws 96 and 98. The tension adjustment opening 38 is exposed, permitting adjustment of the tension of the band 10 (when screws 96 and 98 are loosened).

Figure 11:
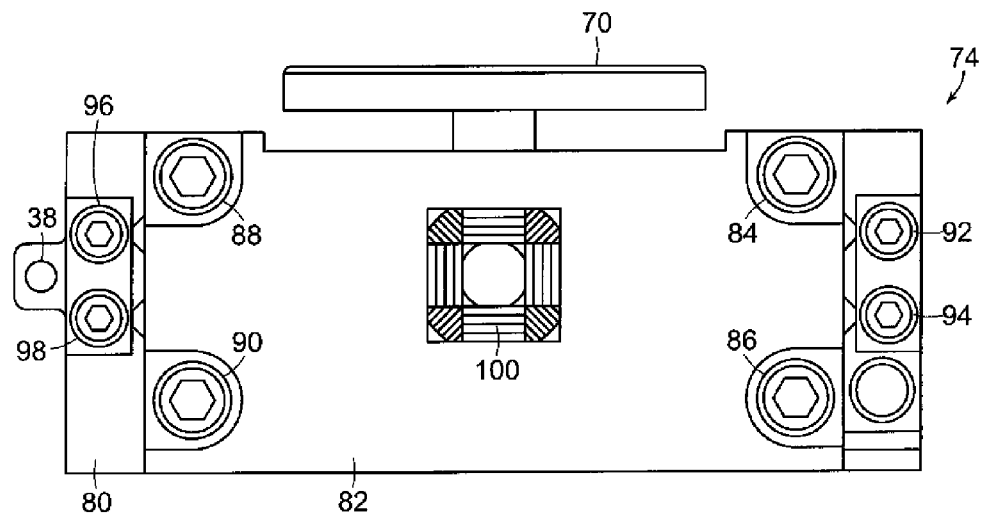
FIG. 11 shows an illustrative side view of the taut-band resonant scanner shown in FIG. 7 with the mirror in a first position.
Figure 12:
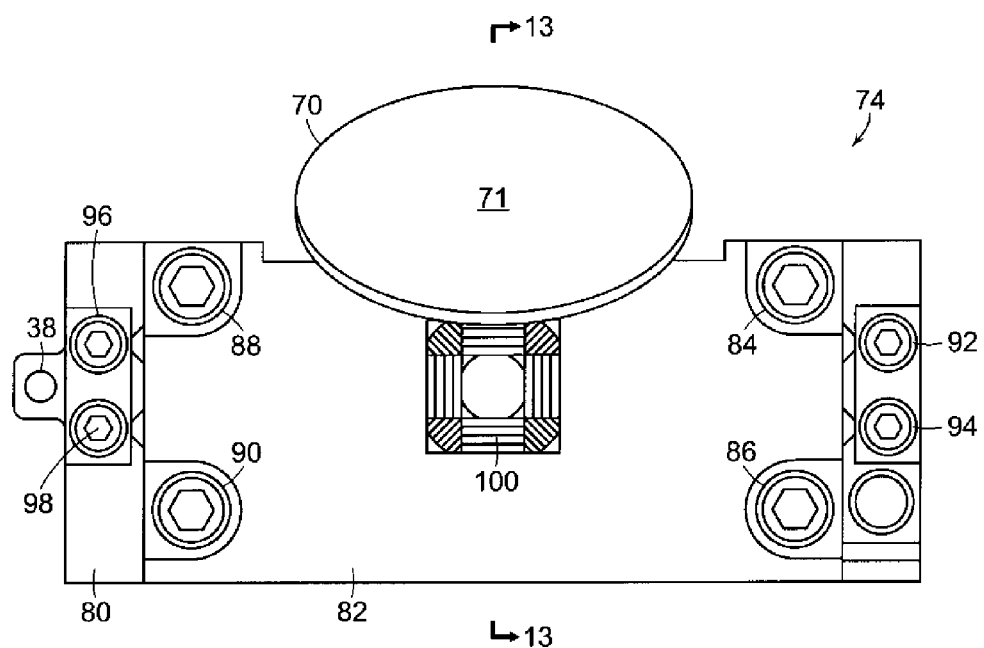
FIG. 12 shows an illustrative side view of the taut-band resonant scanner shown in FIG. 7 with the mirror in a second position.
Figure 13:
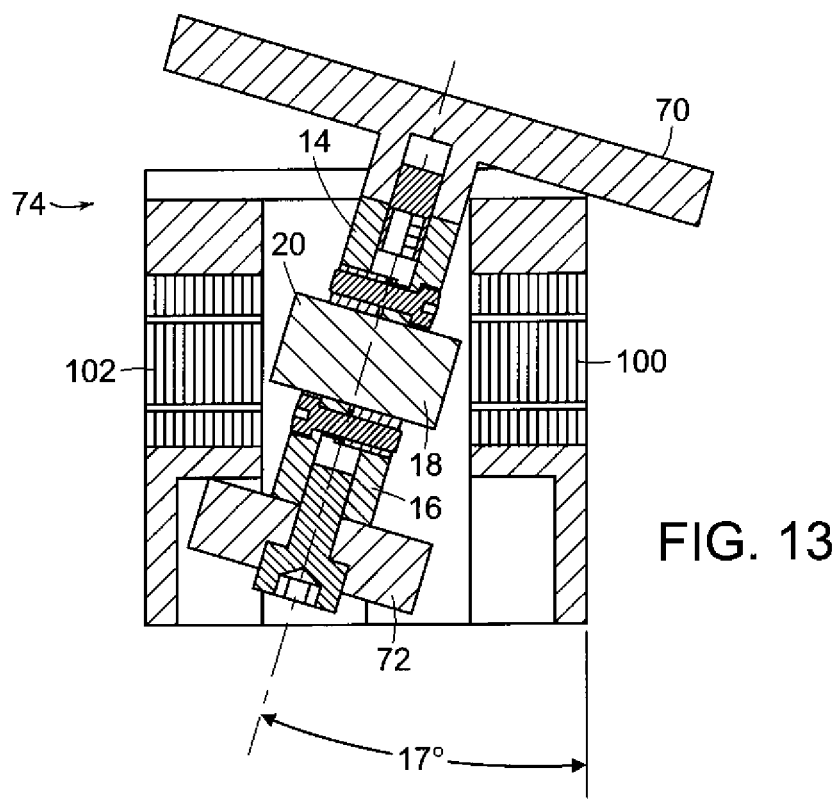
FIG. 13 shows an illustrative sectional view of the taut-band resonant scanner shown in FIG. 12 taken along line 13-13 thereof.
Figure 14:
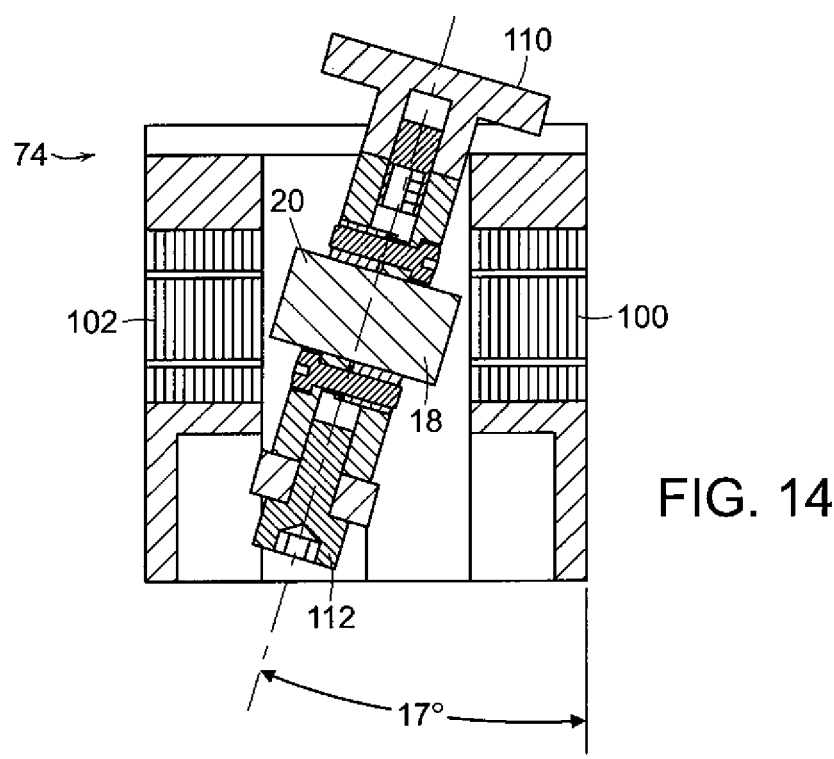
FIG. 14 shows an illustrative sectional view of a taut-band resonant scanner in accordance with another embodiment of the invention in which a different mirror and counter-weight mass are used.

As further shown in FIG. 11, the housing 74 also includes openings in which opposing coils 100 and 102 (shown in FIG. 13) may be positioned. FIG. 12 shows the mirror 70 while the band is being deflected and the face 71 of the mirror 70 is visible. FIG. 13 shows a cross-sectional view taken along line 13-13 of FIG. 12, and as shown in FIGS. 13 and 14, the two coils 100 and 102 are mounted in holes on opposing sides of the housing and the magnet 19 is mounted to the moving structure as discussed above. As shown in FIG. 14, the mirror 70 and counter-weight mass 72 of FIG. 13 may be replaced with a different mirror 110 and different counter-weight mass 112 while keeping all of the remaining elements of the resonant scanner the same. The permits an entire family of scanners to be provided using the same scanner unit.

The resonant scanner sub-assemblies and scanner units of the invention, therefore, permit a variety of different mirror/frequency versions, for example, one a 20 mm diameter mirror operating at a natural resonant frequency of 50 Hz and the other an 8 mm diameter mirror operating at a natural resonant frequency of 200 Hz. Both scanners are comprised of identical parts except for the mirrors themselves and their respective counter masses. Both operate over a scan angle from 0 degrees to 52 degrees optical peak-to-peak. The interchangeable mirrors simply screw onto one end of the mounting structure 12, while the respective counter mass screws onto the opposite end of the mounting structure 12.

The mounting portions 14 and 16 may be formed of a lightweight material such as aluminum, and serve to support the band flexure as well as the magnet 19. The ends of the band are clamped to the frame by means of stainless steel bars and screws. The adjustment opening 38 is provided on a tongue and serves as an attachment point for a band-tensioning lever (not shown) so that the band may be tensioned during assembly to establish the exact natural frequency desired.

The assembly process is to clamp the end 40 of the band securely and the tensioning-end 42 snugly but not tightly and to hang a weight from the tensioning lever (not shown) which weight is selected to provide the desired tension when the weight multiplied by the ratio of the lever arms develops the required force on the band 10. The natural frequency is then measured, and if it is within tolerance, the clamp screws are tightened fully and the weight and lever removed. If the natural resonant frequency is not initially within tolerance the weight is slid either toward or away from the fulcrum as required iteratively until the natural frequency is within tolerance, and the clamp screws are fully tightened supporting the band at the required tension. It is possible of course, to make the band and frame parts of other matched coefficient of thermal expansion materials such as beryllium copper.

Figure 15:
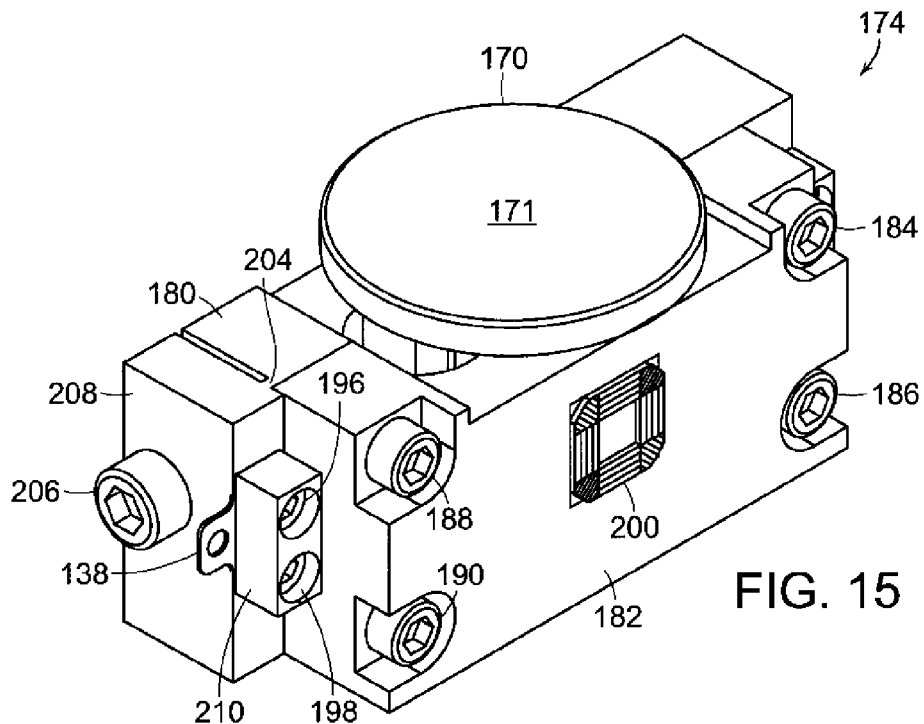
FIG. 15 shows an illustrative isometric top view of a taut-band resonant scanner in accordance with another embodiment of the invention that includes the band and mirror mounting structure shown in FIG. 1.
Figure 16:
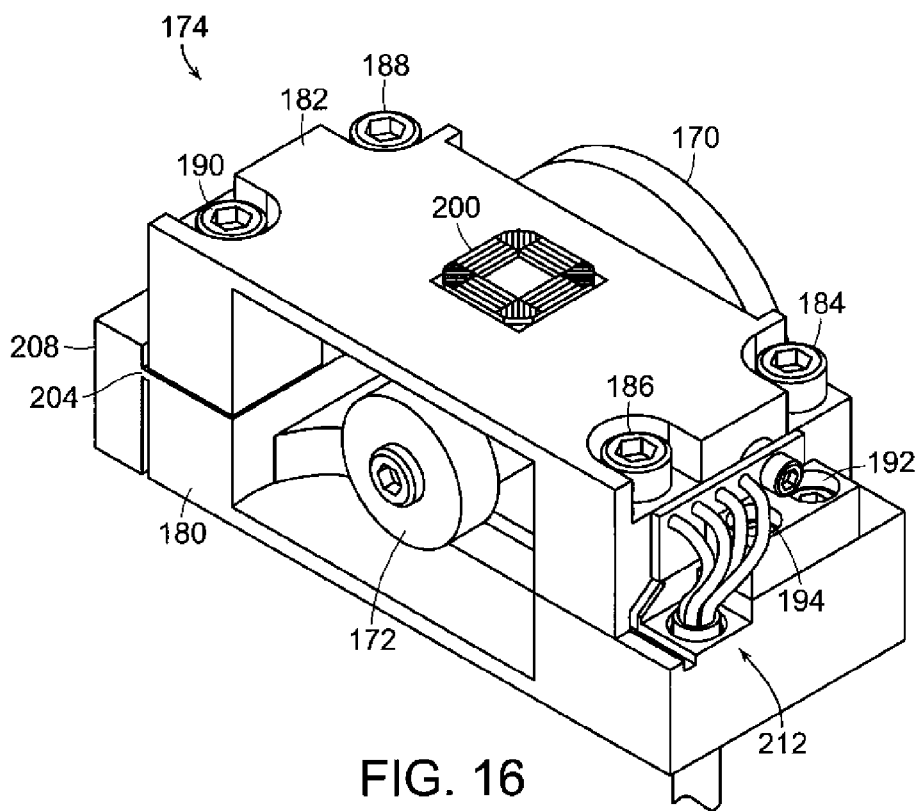
FIG. 16 shows an illustrative isometric side view of the taut-band resonant scanner shown in FIG. 15.
Figure 17:
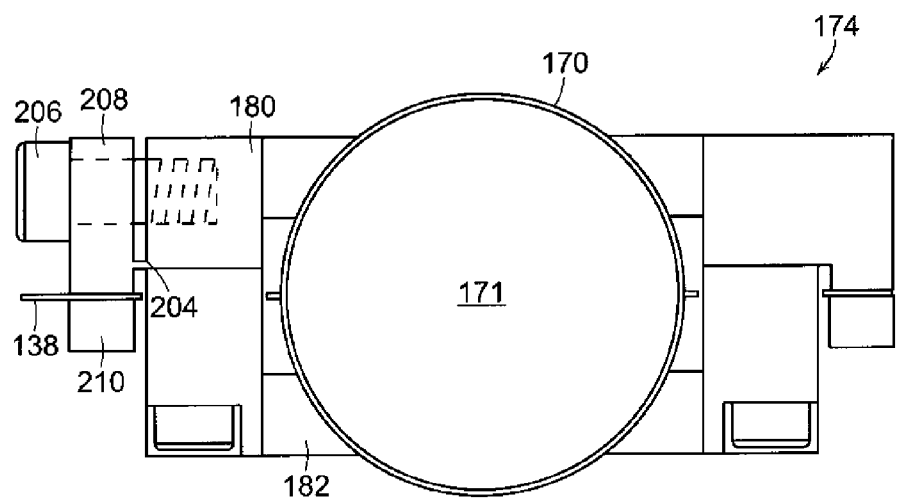
FIG. 17 shows an illustrative top view of the taut-band resonant scanner shown in FIG. 15.
Figure 18:
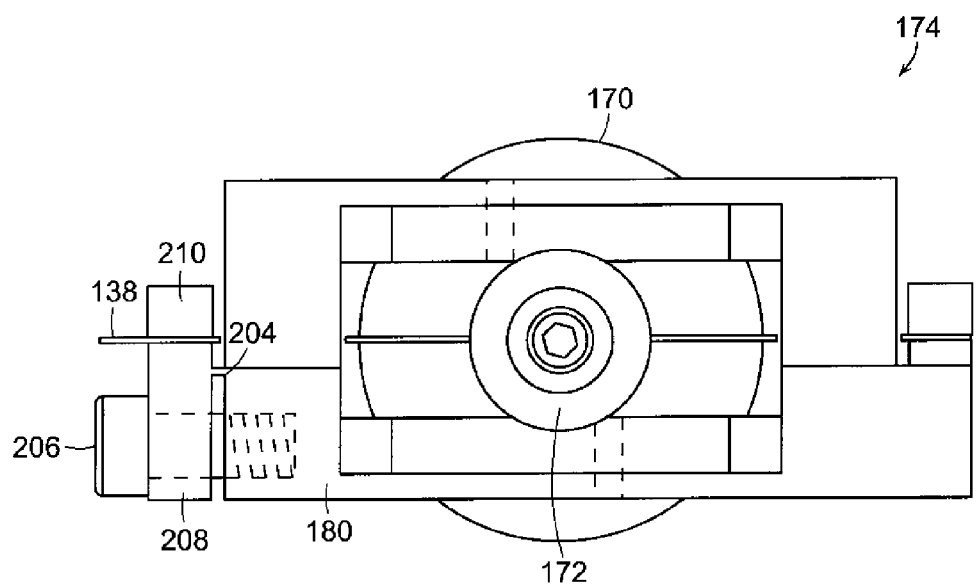
FIG. 18 shows an illustrative bottom view of the taut-band resonant scanner shown in FIG. 15.

FIGS. 15 and 16 show illustrative isometric top and side views of a taut band resonant scanner in accordance with another embodiment of the invention, and FIGS. 17 and 18 show illustrative top and bottom views of the taut-band resonant scanner of FIGS. 15 and 16. In particular, a mirror 170 having a mirror face 171 is mounted on one end of a mirror mounting structure within a scanner housing 174, and a counter-weight mass is mounted to the opposing end of the mirror mounting structure within the housing 174 as discussed above with reference to the prior embodiment.

The housing 174 is formed by two housing portions 180 and 182 that are held together by screws 184, 186, 188 and 190. Mounting holes 30 and 32 of the band 10 (of FIGS. 1-6) are secured to the housing portion 180 by screws 192 and 194, and the mounting holes 34 and 36 of the band 10 (of FIGS. 1-6) are secured to the housing portion 180 by screws 196 and 198. The housing 174 also includes openings in which opposing coils (e.g., one of which is 200 and the other of which is not shown) may be positioned as discussed above with reference to the prior embodiment. Again, the mirror mounting portions may be formed of a lightweight material such as aluminum, and serve to support the band flexure as well as the magnet (e.g., 19 as discussed above). The ends of the band are clamped to the frame by means of stainless steel bars and screws.

The tension adjustment opening 138 is exposed, permitting adjustment of the tension of the band (when screws 196 and 198 are loosened). In particular, and in accordance with the embodiment of FIGS. 15-18, the housing portion 180 includes a flexure hinge 204 that provides compliance in the mounting frame along the flexure length or tension direction. The flexure hinge 204 is positioned as close to the flexure band as possible in order to minimize the change in planarity of the flexure during tuning. A screw 206 is provided in an adjustable portion 208 of the housing portion 180, and the band is mounted to the adjustable portion 208 via the screws 196 and 198. The embodiment shown in FIGS. 15-18 also includes coupling wires 212 for controlling the motor and receiving position feedback signals.

When the screw 206 is tightened, the adjustable portion pivots about the flexure hinge 204, causing the band to be stretched (put into tension). When the screw 206 is loosened, the adjustable portion pivots back about the flexure hinge 204, causing the band to relax (reducing tension) on the band. After assembly including tightening the screws 192 and 194 to their final torque, the clamp block 210 is adjusted snug but not tight by tightening the screws 196 and 198 to a low torque level such as 2 in-oz. The frequency of the scanner is then fine-tuned by tightening the screw 206 until the natural frequency of vibration is within tolerance, and the screws 196 and 198 are then tightened to their final torque. If in the process of tightening screw 206, the desired frequency is over-shot, simply reversing the screw direction will slack the flexure band so that the tuning process may be re-iterated. Again, the band and frame parts may be formed of a variety of matched coefficient of thermal expansion materials such as beryllium copper.

In accordance with each of the above embodiments, one of the coils serves as a drive coil, and the other serves as a velocity pickup coil to provide velocity feedback to the electrical servo driver (not shown). It is a property of harmonic motion that the time taken to scan is the same for all scan angles. As a result, the velocity of the motion must increase in proportion to the angle. The velocity coil interacts with the field on one end of the magnet in such a way that a voltage is induced in it which is proportional to the instantaneous velocity of the magnet. Thus a sinusoidal voltage appears across this coil which is phase locked with the motion of the magnet (and thus the mirror) whose amplitude is proportional to the velocity which is itself proportional to the amplitude of the scan angle, and so provides a faithful feed-back control signal to set and maintain the amplitude of the scan.

The other coil is used to drive the scanner. Because the scanner operates at its natural frequency, the Q is very high, and so the drive coil needs only to make up for the losses in the system. Typically, a servo drive for a resonant scanner is self-oscillating. That is, a small pulse is provided to start the scanner moving, and the velocity signal is then amplified and fed back to the drive coil. In this way the scanner is always driven at its natural frequency, and the drive signal is a clone of the feedback signal so that the phase is locked between the motion of the mirror and the drive voltage. As pointed out above, the amplitude of the velocity coil is used to set and maintain the scan amplitude. This is generally accomplished by comparing the rectified velocity signal with that of a reference voltage.

The overall size of the scanner is scaled to the diameter of the largest mirror in a particular family of form-fit-function interchangeable scanners, differentiated by the size of the mirror and the frequency of operation. Other than the mirror and its associated counter mass, the scanner parts may be identical for each different type of scanner. In further embodiments, the elongated band itself may be replaced in order to change the operating characteristics of the scanner, e.g., by changing the thickness of the band and/or the material from which the elongated band is made.

It will therefore, be appreciated by those skilled in the art that there is an infinite number of mirror/band/frequency combinations that may be provided between the 20 mm diameter size and the 8 mm diameter size, as well as below the 8 mm diameter size and above the 20 mm diameter size. The extremes of mirror size in a particular family are limited on the upper end by the fatigue stress limit of the particular flexure design, chosen for a desired lifetime which can range downward from an indefinite life as desired by the requirements of the application, and on the lower end by the natural frequency of operation of the taut band/mounting block/magnet assembly without the added load of a mirror mass. There is also an infinite number of such families of scanners, with each family scaled to the largest mirror diameter desired.

It is seen then that the defects of the prior art are all addressed and ameliorated by the present invention. First, by mounting the mirror perpendicular to the width dimension of the band, the wobble is reduced or eliminated. Second, the transitions between the clamped and active regions of the band are smooth and slowly-varying in dimension, so that the stress concentrations are eliminated. Third, a family of mirrors is provided over a large range of size and frequency all with the same form fit and function, and sharing all parts except for the mirror and counter mass. Fourth, the materials of construction are matched for coefficient of thermal expansion so that thermal drift is reduced or eliminated. Further, the band is constructed of a material selected for high resistance to stress corrosion so that corrosion failure is also reduced or eliminated.

Those skilled in the art will appreciate that numerous modifications and variations may be made to the above disclosed embodiments without departing from the spirit and scope of the invention.

What is claimed is:

1. A taut-band resonant scanner comprising:
   an elongated band having a length in an elongated direction, a width in a width direction that is orthogonal to the elongated direction, and a thickness in a thickness direction that is orthogonal to both the width direction and the elongated direction, wherein the thickness is substantially smaller than the width and wherein the width direction and elongated direction define a band width/length plane;
   a sub-assembly that is attached to a portion of the band, said sub-assembly including at least one mounting structure to which a mirror may be attached to the sub-assembly such that the mirror will have a mirror face that is located in a plane that is not parallel with the band width/length plane.

2. The taut-band resonant scanner as claimed in claim 1, wherein said mirror face is located in a minor face plane that is orthogonal to the band width/length plane.

3. The taut-band resonant scanner as claimed in claim 1, wherein said sub-assembly is formed of two half portions that capture the band between the half portions.

4. The taut-band resonant scanner as claimed in claim 1, wherein said band is secured in tension within a housing at mounting structures within the housing, and wherein the band and mounting structures are each formed of materials having substantially the same coefficients of thermal expansion.

5. The taut-band resonant scanner as claimed in claim 1, wherein said band and said sub-assembly are formed of the same material.

6. The taut-band resonant scanner as claimed in claim 1, wherein said band includes at least one fixed region where the band is secured to a scanner housing, and at least one active region, and wherein at least one transition feature is provided that reduces stress concentrations between the fixed region and the active region.

7. The taut-band resonant scanner as claimed in claim 1, wherein the band and sub-assembly may be used with a variety of different mirrors at different frequencies.

8. A taut-band resonant scanner comprising:
   an elongated band formed of a material having a first coefficient of thermal expansion;
   a sub-assembly that is attached to a portion of the band, said sub-assembly being formed of two half portions that capture the band between the half portions, and
   a housing including mounting structures to which said band is secured in tension within the housing, said mounting structures being formed of a material having a second coefficient of thermal expansion, and wherein said first coefficient of thermal expansion is substantially the same as the second coefficient of thermal expansion,
   wherein said elongated band has a length in the elongated direction, a width in width direction that is orthogonal to the elongated direction, and a thickness in a direction that is orthogonal to both the width direction and the elongated direction, wherein the thickness is substantially smaller than the width and wherein the width direction and elongated direction define a band width/length plane; and
   wherein the sub-assembly includes at least one mounting structure to which a mirror may be attached to the sub-assembly such that the mirror will have a mirror face that is located in a plane that is not parallel with the band width/length plane.

9. The taut-band resonant scanner as claimed in claim 8, wherein said minor face is located in a plane that is orthogonal to the band plane.

10. The taut-band resonant scanner as claimed in claim 8, wherein the band and sub-assembly may be used with a variety of different mirrors at different frequencies.

11. A taut-band resonant scanner for use with any of a plurality of mirrors and for use at a plurality of operating frequencies, said taut-band resonant scanner comprising:
   an elongated band having a length in an elongated direction, a width in a width direction that is orthogonal to the elongated direction, and a thickness in a thickness direction that is orthogonal to both the width direction and the elongated direction, wherein the thickness is substantially smaller than the width and wherein the width direction and elongated direction define a band width/length plane; and
   a sub-assembly that is attached to a portion of the band, said sub-assembly being formed of two half portions that capture the band between the half portions, and including mounting features on opposing ends of the sub-assembly to which a mirror and a counter-weight mass may be attached, and including at least one magnet having an exposed face in a plane that is substantially parallel with the band width/length plane.

12. The taut-band resonant scanner as claimed in claim 11, wherein said band is secured in tension within a housing at mounting structures within the housing, and wherein the band and mounting structures are each formed of materials having substantially the same coefficients of thermal expansion.

13. The taut-band resonant scanner as claimed in claim 11, wherein said band and said mounting structures are formed of the same material.

14. The taut-band resonant scanner as claimed in claim 11, wherein said band includes at least one fixed region where the band is secured to a scanner housing, and at least one active region, and wherein at least one transition feature is provided that reduces stress concentrations between the fixed region and the active region.

15. The taut-band resonant scanner as claimed in claim 14, wherein said scanner housing further includes a flexure hinge and an adjustment means for adjusting a tension on the elongated band.

\* \* \* \* \*